(12) United States Patent
Daspit

(10) Patent No.: US 6,276,726 B1
(45) Date of Patent: Aug. 21, 2001

(54) PIPE LINE REPAIR ANTI-CORROSION ELECTRICALLY ISOLATED CLAMP-COUPLING

(76) Inventor: Ronald A. Daspit, 1301 E. Genie St., Parish of St. Bernard, LA (US) 70043

( * ) Notice: Subject to any disclaimer, the term of this patent is extended or adjusted under 35 U.S.C. 154(b) by 0 days.

(21) Appl. No.: 09/389,625

(22) Filed: Sep. 3, 1999

(51) Int. Cl.[7] .................................................... F16L 21/06
(52) U.S. Cl. .......................... 285/15; 285/373; 285/379; 285/420
(58) Field of Search .......................... 285/15, 197, 198, 285/199, 420, 373, 379, 55

(56) References Cited

U.S. PATENT DOCUMENTS

| | | | |
|---|---|---|---|
| 3,017,204 | | 1/1962 | Smith ................................... 285/373 |
| 3,527,483 | * | 9/1970 | Dashner ............................... 285/373 |
| 3,944,260 | * | 3/1976 | Petroczky ............................. 285/373 |
| 3,954,288 | * | 5/1976 | Smith ................................... 285/373 |
| 4,015,634 | * | 4/1977 | Christie ............................... 285/373 |
| 4,652,023 | * | 3/1987 | Timmons ............................. 285/373 |
| 4,768,813 | * | 9/1988 | Timmons ............................. 285/373 |
| 5,273,322 | * | 12/1993 | Straub ................................. 285/373 |
| 5,310,223 | * | 5/1994 | Straub ................................. 285/373 |
| 6,131,957 | * | 10/2000 | Saito et al. ........................... 285/373 |

* cited by examiner

*Primary Examiner*—Eric K. Nicholson

(57) ABSTRACT

A pipeline repair clamp partially or completely embracing the outer wall circumference of a pipe having a damaged area; a single or complementary semi-cylindrical clamp bodies having diametral engagement, the bodies having a semi-cylindrical bore contiguous to the pipe wall and with continuous seal grooves at its ends and sides, there being a metallic liner or dielectric coating said bore and terminating at the bottom of said grooves, a continuous gasket-compression seal carried in said grooves adapted to embrace said damaged area and seal with the pipe wall and at said liner-coating termination precluding electrolysis, and means forcefully drawing the clamp bodies onto the pipe wall.

12 Claims, 4 Drawing Sheets

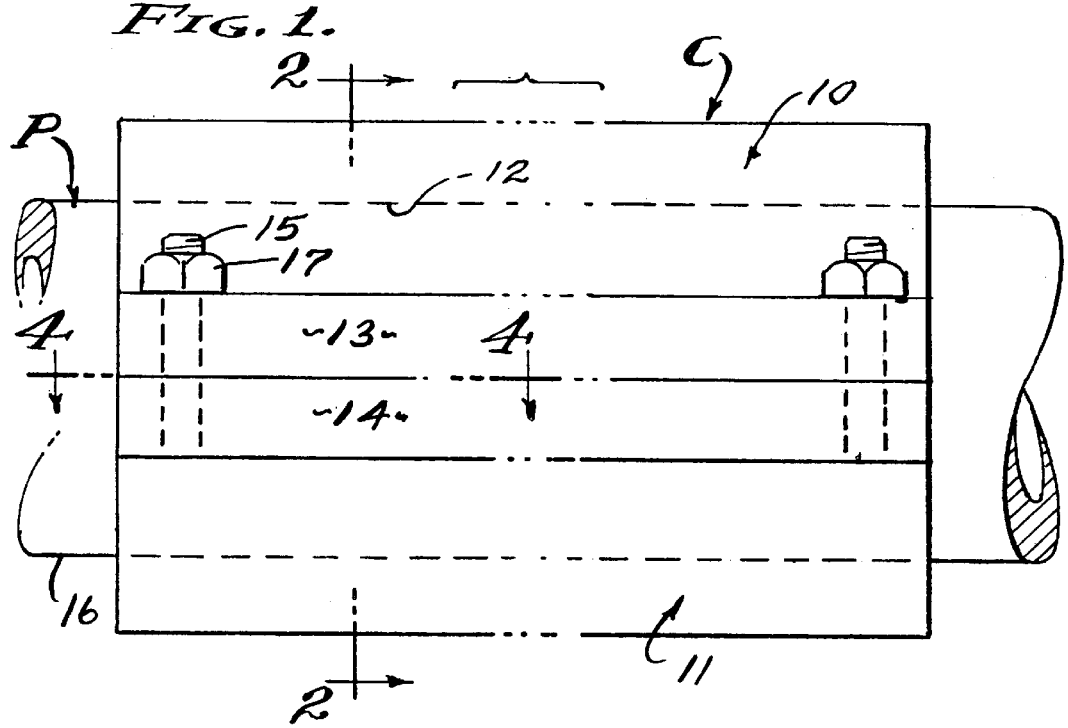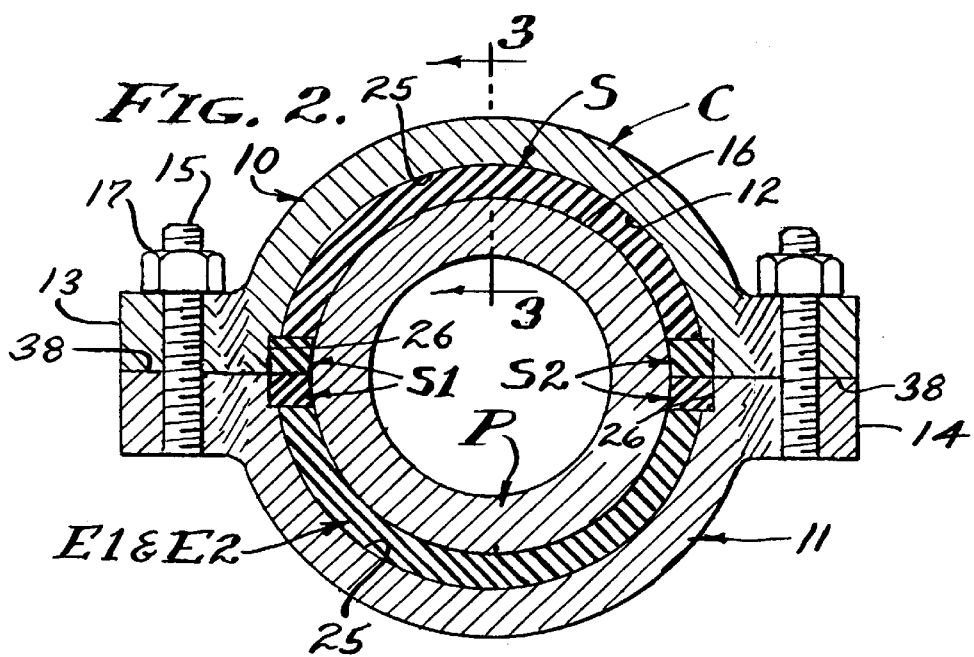

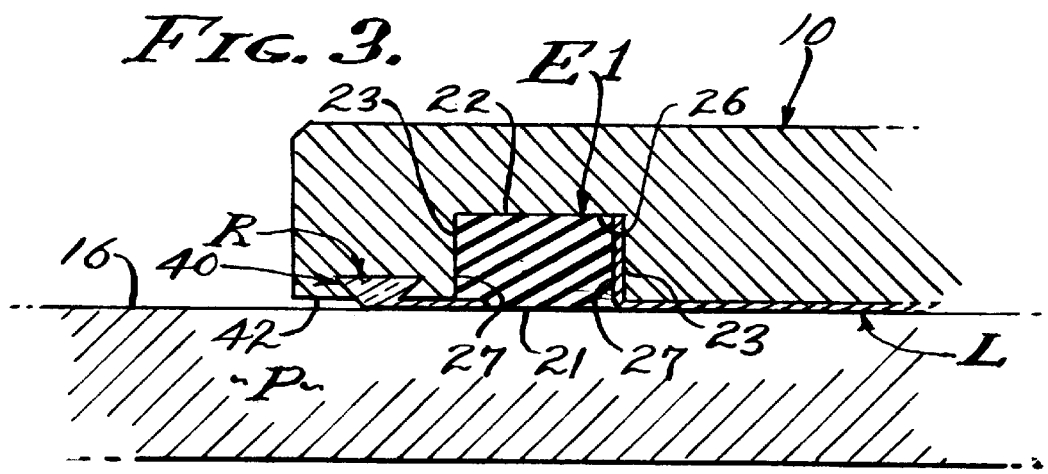
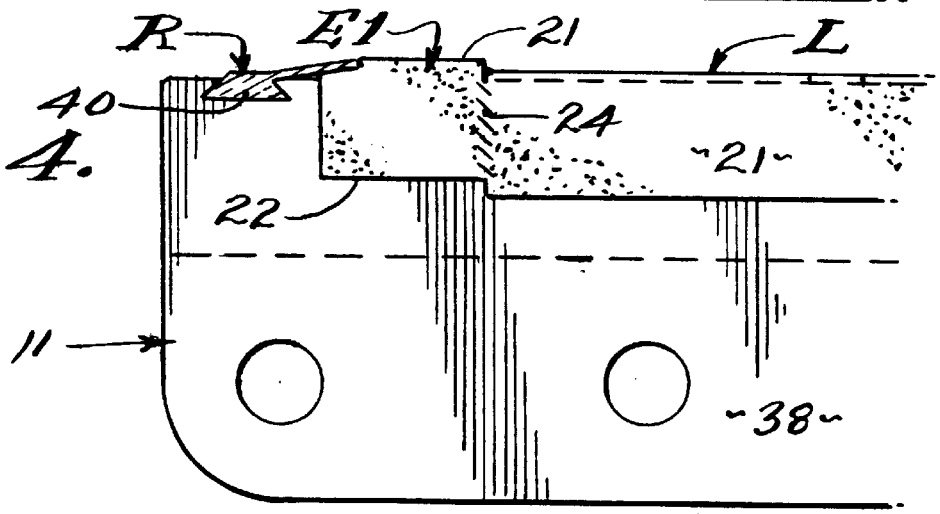
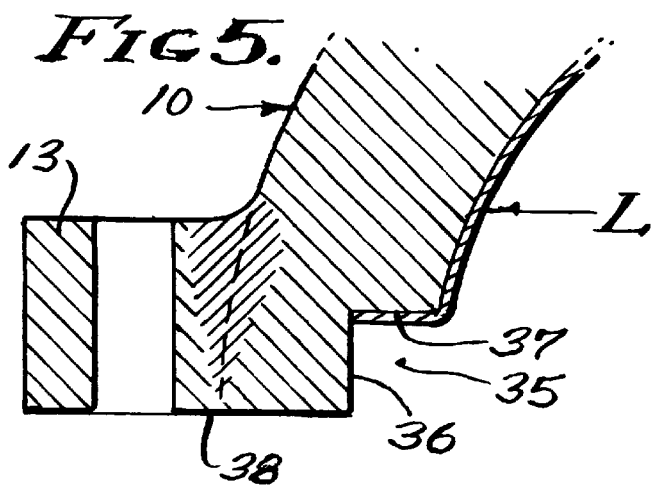
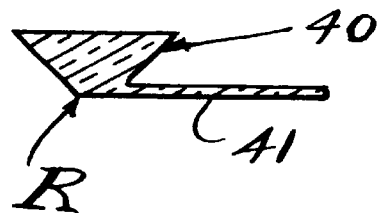

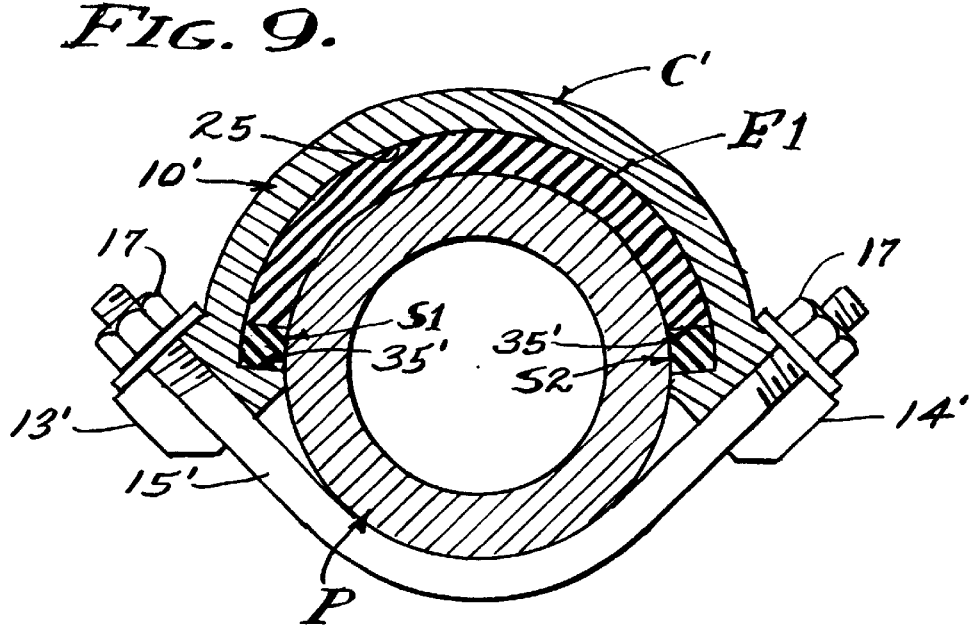
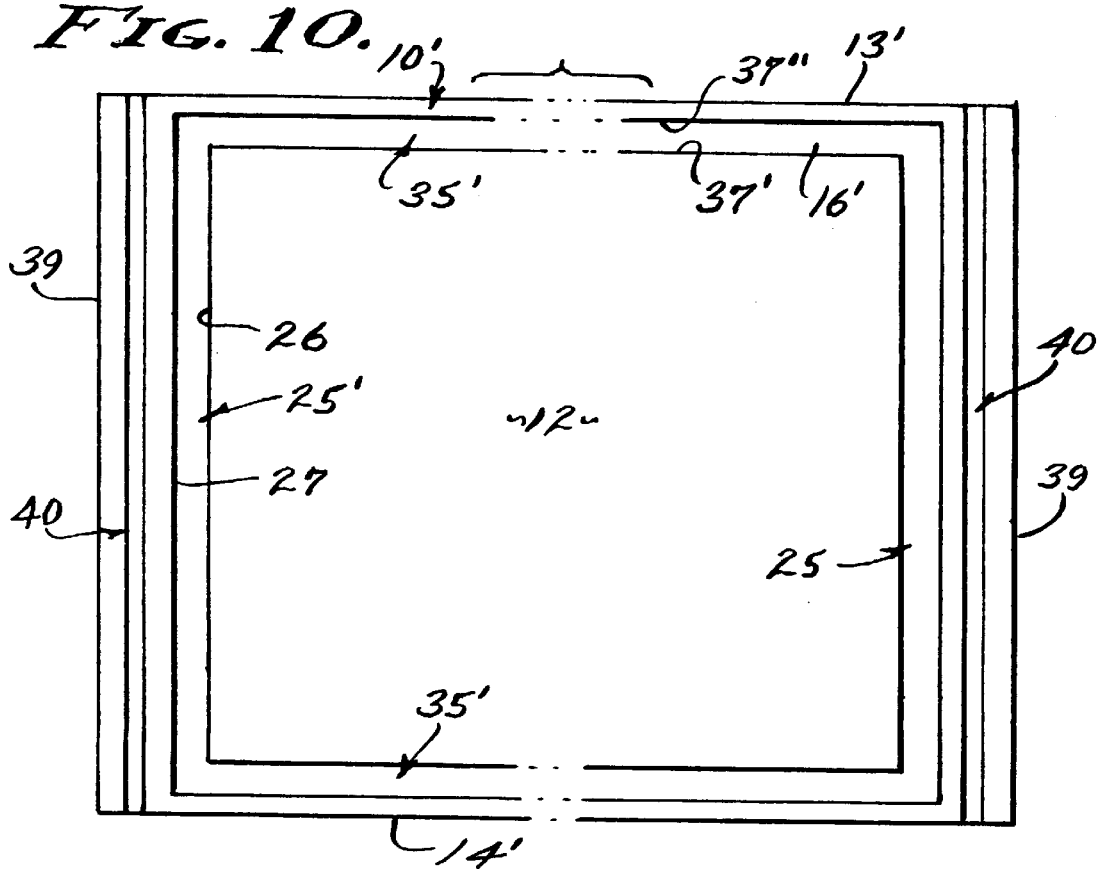

PIPE LINE REPAIR ANTI-CORROSION ELECTRICALLY ISOLATED CLAMP-COUPLING

BACKGROUND OF THE INVENTION

This invention relates to pipe repair clamp-couplings for servicing pipe lines by closing over leaks and for joining together sections of pipe. The prior art provides repair clamps comprised of semi-cylindrical body members joined together to form a cylindrical sleeve or coupling member that surrounds and/or joins the pipe. The body members interface at a diametrical axially disposed plane, and each member carries separate semi-circular and longitudinal gasket members to seal the opposite semi-circular ends of the assembled clamp, and to seal along the opposite interfaced sides of the body members. When these coupling members are assembled and clamped onto a leaky pipe, the circumferential and longitudinally disposed gaskets seal against the outside diameter wall of the pipe and stop leakage embraced thereby.

In order to facilitate and ensure a proper clamp-coupling assembly, so called "girdering" has been provided to prevent displacement of the gasket-seals from working position, as may be caused by scraping or by subjection to high velocity high pressure fluid discharge from or through the pipe under repair. Heretofore, girdering has been in the form of a series of thin separated metal plates supported axially from a sheet metal strip attached as by welding to the inner diameter of the coupling members, so as to extend partially over the gasket-seals to retain them in position. When the clamp-coupling is assembed over the pipe, the gasket-seals are compressed so as to produce a fluid tight seal and the girdering plates are firmly pressed against the outer pipe diameter walls leaving an interstice between the clamp members and outer pipe circumference commensurate with the thickness of the girdering sheet metal strip.

A deficiency in the separated girdering plates of the prior art is that the circumferential separation of the metal retaining plates and supporting strip permits the gasket-seal material to be extruded from its positioning groove by internal fluid pressure within the pipe line and clamp-coupling, it being an object of this invention to eliminate the aforesaid insterstices and to confine the gasket-seal material to its positioning groove so as to preclude said extrusion of the gasket-seal material by eliminating said girdering plates and the separation therebetween.

Deterioration of pipelines and their various fittings and repair clamp-couplings is a serious problem that repeats itself in pinholes and structural weaknesses and eventual leakage and other such failures. Deterioration can be found as the result of; 1) normal exposure to an environment; 2) service in the transport of corrosive or incompatible and/or destructive fluids (gas or liquid); and 3) electrolysis and its anodic effect.

With respect to 1) above; normal service may involve heat to cold exposure, dry to wet exposure; fresh water to salt (Saline or toxic) water exposure, or any combination thereof, and all of which in time will destroy a pipeline installation.

With respect to 2) above; the clamp-coupling wall structure may be consumed by corrosion or by chemical reaction so as to destroy support for the aforementioned gasket-seal, resulting in failure.

With respect to 3) above; the clamp-coupling wall structure may be eaten away by electrical discharge so as to remove support for the aforementioned gasket-seal, resulting in failure.

It is these basic detrimental factors which this invention addresses, in order to improve pipeline repair clamp-couplings and greatly increase their longevity and reliability.

State of the art pipeline repair clamp-couplings are fabricated of steel and comprised of rolled sections and planar flanges and welded together and machined as required to present the aforesaid separate circumferential and langitudinal gasket-seal grooves. These completed clamp-coupling assemblies include these separate gasket-seal, installed and secured in said grooves by the thin sheet metal girdering. And, all of which is characteristically unprotected against oxidation and subject to corrosion in a normal environment. In practice, the sheet metal girdering deteriorates even without exposure to an adverse environment. As a result, unprotected clamp-couplings of the type under consideration become faulty while stored in an equipment depot or warehouse. Therefore, it is a general object of this invention to protect pipeline clamp-couplings from the normal environment, so that they remain reasonably fresh and do not quickly deteriorate. Accordingly, internal areas of this clamp-coupling are coated with a barrier impervious and/or resistant to the corrosive or chemical effect of the atmosphere.

It is common practice for piplines to transport sour gas/sour oil, salt solutions, and mixtures containing sulfites, sulfates, sulfuric acid, etc. Such pipelines are in use in petroleum/gas production and refining, and in the chemical and related processing industries. Accordingly, there is a multitude of corrosive and chemically active fluids transported by pipeline over short as well as long distances. And, for any fluid, whether common or exotic, there are materials and particularly coatings which are impervious, inert or at least resistant thereto. For example, Electroless Nickel Plating is an electrically conductive protective coating; whereas TEFLON (™) (sprayed and baked on) is a non-conductive protective coating. It is to be understood that there are many different methods of plating and/or coating that are to be employed in practicing this invention, selected according to compatibility with the transported fluid. The coating employed for each transported fluid product is therefore selected as circumstances require, providing that it qualifies as impervious, inert or resistant to the product fluid. However and in accordance with this invention, when employing an electrically conductive fluid barrier, only the surfaces exposed to the product fluid are coated, thereby eliminating the possibility of the clamp-coupling becoming anodic. But with non-conductive coatings the entire interior of the clamp bodies can be coated, providing it does not interfere with the introduction of and retaining of the gasket-seals. Therefore, it is an object of this invention to selectively coat only those areas of the clamp bodies which are exposed to the product fluid, when conductive coatings are employed, thereby reducing the effect of electrolysis.

The gasket-seal employed herein follows the teaching of the art, and is essentially a gasket by virtue of its flat sided configuration for sealing between opposing planar surfaces. And, as a seal it has a cross section of substantial thickness with a body volume adapted to be compressed so as to tightly flow into and fill a seal groove of the same cross section. The semi-circular end gasket-seals are angularly abutted and fused to the longitudinal side gasket-seals, for seal continuity without interruption.

In accordance with this invention, there are opposite end semi-circular gasket-seal retainers positioned by semi-circular anchor grooves, and the opposite side longitudinal gasket-seals are cemented into position in complementary longitudinally siposed seal grooves. The semi-circular gasket-seal retainers have a coextensive anchor portion received by the groove configuration for positioning a continuous rim thereof over the edge of the semi-circular gasket-seals, it being an object to provide such a gasket-seal retainer and gasket-seal reliably captured in position thereby.

In accordance with this invention, the deficient prior art sheet metal separated plate girdering and welding is replaced by the impervious gasket-seal retainer characterized by its continuous rim and anchor captured in the anchor groove formed in the clamp bodies. In practice, dove-tail anchor grooves are formed in the inner diameter wall of the clamp bodies, there being a semi-circular anchor groove at each opposite end of the clamp bodies for the end gasket-seal retainers. The semi-circular gasket-seal grooves and anchor grooves open into longitudinal seal grooves at opposite sides of the clamp body for gasket-seal continuity without interruption. The anchor grooves are machined and/or formed into the inner diameter walls of the clamp bodies, and the semi-circular gasket-seal retainers are flexible and extruded or injection molded plastic of material selected for tolerance to the product fluid being transported by the pipeline, for example TEFLON(™) or the like.

SUMMARY OF THE INVENTION

This invention has as its general object to improve the effectiveness of pipeline repair clamp-couplings and isolation of the product fluids transported thereby from the exterior environment. State of the art clamp-couplings are employed, characterized by gasket-seals positioned so as to surround a leak or deteriorated section of pipe, it being the exterior of the pipe to which the clamp-coupling is sealed. The clamp-coupling is comprised of a mating pair of semi-cylindrical bodies, the inner half diameter of which are continuously grooved to carry said gasket-seal comprised of a semi-circular seal member retained at each end of the body, and integral longitudinal seal members cemented in place at each side of the body. The seal members are abutted one with the other and fused integrally together so to be continuous. In accordance with this invention, the gasket-seal is retained and cemented in working position before installation of the clamp-coupling onto the pipe, a feature being the integral continuity of the gasket-seal and its continuous accomodation through openly adjoining seal grooves which eliminates separations and/or interstices, resulting in uniform interface engagement of the clamp bodies with the seals compressed against the pipe. And significantly, the clamp bodies are protected with an interior liner or coating confined to exposure to the fluid product and thereby isolated from the external envoronment.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a side elevation view of the pipeline repair clamp-coupling in its installed condition.

FIGS. 2, 3 and 4 are enlarged detailed sectional view taken as indicated by lines 2—2 and 4—4 on FIG. 1 and 3—3 on FIG. 2.

FIG. 5 is an enlarged fragmentary view illustrating the protective coating and its relationship to the seal groove for isolation of the product fluid from the exterior of the clamp-coupling.

FIG. 6 is an enlarged cross-sectional view of the retainer.

Figure 7:
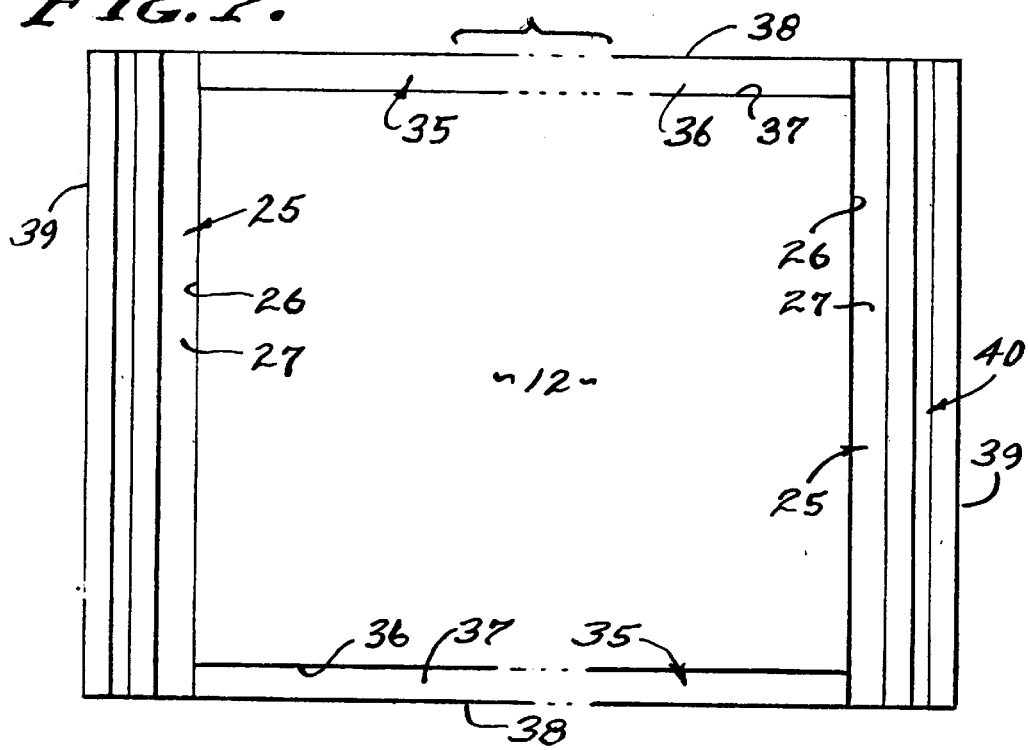
FIGS. 7 and 8 are flat layout views of the inner half diameter of a coupling body, FIG. 7 illustrating the gasket-seal and retainer grooves prior to installation of the gasket-seals and end retainers respectively, and FIG. 8 illustrating installation of said gasket-seals and said end retainers respectively.

And, FIGS. 9 and 10 illustrate a second embodiment of the basic repair clamp, FIG. 9 being a sectional view similar to FIG. 2, and FIG. 10 being a layout view similar to FIG. 7 and showing the inner semi-circular diameter of the clamp body, the gasket-seals removed.

PREFERRED EMBODIMENT

This invention relates to pipeline repair and specifically to clamp-couplings that embrace leakage that often occurs in sections of pipe that are otherwise servicable. As shown in FIGS. 1 and 2 of the drawings, a clamp-coupling C is comprised of complementary semi-cylindrical bodies 10 and 11 that interface on a diametral plane coincidental with the longitudinal axis of a pipe P over which it is clamped. And, an inner diameter cylindrical bore 12 is established by the mating bodies 10 and 11 that circumferentially embrace the outer diameter 16 of the pipe P with minimal clearance when opposed flanges 13 and 14 are brought into interface engagement (see FIG. 2). In practice, the body flanges are forced together by bolt fasteners or studs 15 threaded into one flange and the other flange positioned by a nut 17. There is a series of such fasteners along each side of the coupling bodies.

Figure 8:
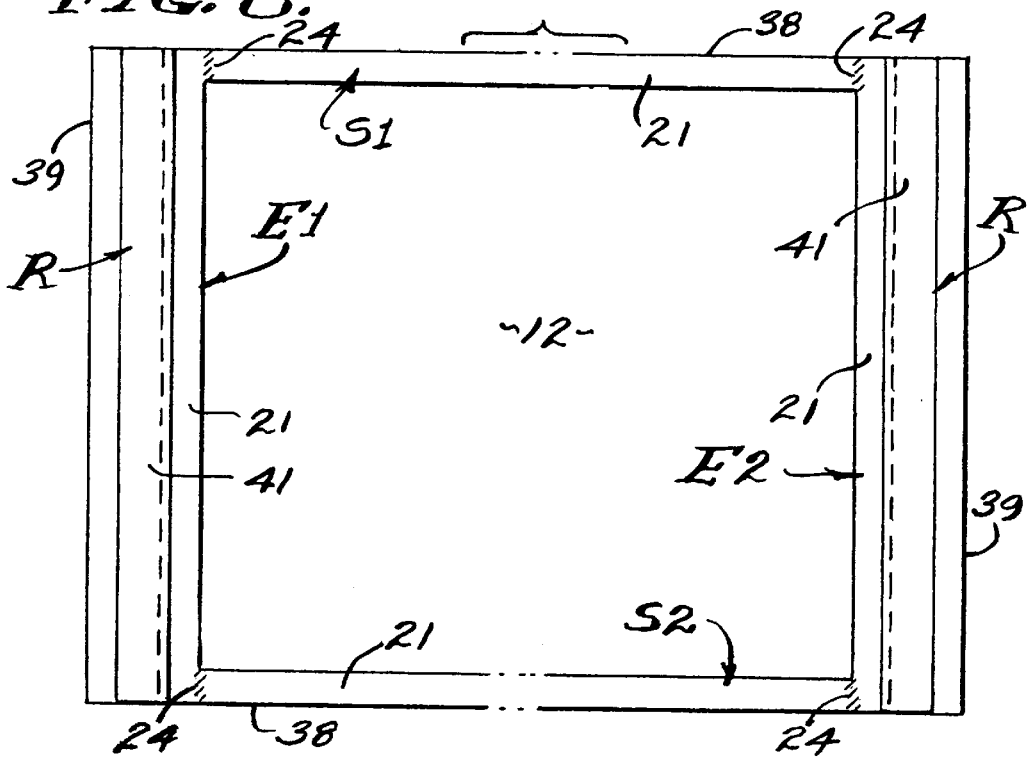

Referring now to FIGS. 2, 7 and 8, there is a single gasket-seal S coextensive with the perimeter of each clamp body 10 and 11, each gasket-seal being comprised of four seal members carried by each clamp body 10 and 11; semi-circular end seal members E1–E2, and elongated side seal members S1–S2. The seals S have a dual function in that they operate as a gasket between opposed faces and as a compression seal flowing into intervening space and interstices between the seal grooves and the outer diameter 16 of the pipe P.

There are end gasket-seal members E1–E2 engaged between the inner cylinder bore 12 and exterior diameter 16 of pipe P, and there are side gasket-seal members S1–S2 engaged one with the other and with the exterior diameter 16 of the pipe P. The gasket function of these seal members is performed by flat top and bottom faces 21 and 22, one engaged against the clamp body and the other against the outer diameter 16 of the pipe P. The compression seal function of these seals is performed by its deformable body of elastomer that is supple and pliant and adapted to flow into crevaces of any configuration. Accordingly, the gasket-seal members are of an elastomer of substantial depth between top and bottom faces 21 and 22, and likewise of substantial width between their opposite side faces 23. In practice, the seal members E1–E2, and S1–S2 are rectangular in cross section as shown, although it is to be understood that other seal configurations can be employed. In practice, the longitudinal gasket-seal members are ⅜ inch square, and the circular gasekt seal members are ⅝ inch deep (radially) and 1 inch to 1¼ inch wide (longitudinally), as clearly shown in the drawings.

In practice, these elastomer gasket-seal members E1–E2 and S1–S2 are made of Nitrile rubber having a Durometer hardness of 70 with suitable compression and flow characteristices. As best illustrated in FIGS. 4 and 8 the abutted ends of the seals are integrally joined and fused together at 24 for gasket and compression seal function continuity.

As shown in FIGS. 3 and 4, the end gasket-seal E1 (also E2) is positioned in and carried by semi-circular seal groove 25 open onto the pipe P and having a bottom 26 positioned by the radial extent of axially spaced side walls 27. The cross section of the gasket-seal member E1 and E2 completely occupy their respective groove cross sections. And in FIG. 4 the top face 21 of end gasket seal member E1 (also E2) is initially disposed in a plane slightly above the inner diameter bore 12 of the clamp body 10 (also body 11), the elastomer body of the gasket-seal S being slightly compressible as is shown in FIG. 3 wherein the gasket-seal member E1 (also E2) is compressed tightly onto the outer diameter 16 of the pipe P.

As shown in FIG. 1, the gasket-seal members S1 and S2 are abutted and fused to the end gasket-seal members E1 and E2, the side gasket-seal members being positioned in and carried by longitudinal seal grooves open onto the pipe P and each having a bottom 36 postioned by the radial extent of a single side wall 37 circumferentially offset from an open side of the groove at the interface plane 38 of flanges 13 and 14. The cross section of the gasket-seal members S1 and S2 completely occupy the grooves 35 respectively, with the juxtaposed sides 23 of opposed seals S carried by the two bodies 10 and 11 engaged one with the other (see FIG. 2). The top faces 21 of gasket-seal members S1 and S2 are initially disposed in a plane slightly above the inner bore 12 of the bodies 10 and 11. The elastomer side bodies of opposed gasket-seals S being compressed tightly side by side and onto the outer diameter 16 of the pipe P.

Referring now to the gasket-seal retainer R as shown in FIGS. 3, 4, 6 and 8, the outer diameter wall 16 of the pipe P is closely embraced by the cylindrical bore 12 formed by the mating clamp bodies 10 and 11. The flanges 13 and 14 have interfaces 38 engageable at said diametral plane coincidental with the common axes of the clamp-coupling C and pipe P, joinder thereof being sealed by the side gasket-seal members S1 and S2 at opposite sides of the clamp-coupling. Opposite peripheral ends of the clamp-coupling C are sealed by the end gasket-seal members E1 and E2. Accordingly, the interior bore 12 is isolated from the exterior environment by the gasket and compression seal functions surrounding the clamp-coupling interior as best illustrated in FIG. 8.

Referring now to FIG. 7 of the drawings, the interior of each clamp body 10 and 11 is adapted to receive and hold the gasket seals comprised of members E1–E2 and S1–S2. It is the interconnected gasket-seal grooves. 25 and 35 hereinabove described which position and enable the dual gasket and compression seal functions. And in accordance with this invention the rectangular configuration of gasket-seal S assembly integrally molded or fused together at 24 is arcuately warped into opposite end grooves 25 and laid in the opposite side grooves 35, and the retainer R is received and held by an interlock means 40 between the groove 25 and ends 39 of each clamp-coupling body.

The retainer R is preferably an extruded plastic member, flexible so as to form a stiff continuous semi-circular rim 41 of minimal thickness to lie flat and contiguous to the clamp-coupling bore 12. In practice, the rim is 0.040 to 0.050 inch thick, or more dependent upon the size of the clamp-coupling which will vary from an inch or two to more than 4 or 5 foot diameter. The clamp-coupling is counterbored at 42 to accomodate the thickness of the retainer rim 41, and the interlock means 40 for holding the retainer is preferably a semi-circular dovetail extending parallel to the gasket-seal groove 25 and coextensively between the interfaces 38 at opposite side flanges 13 and 14 (see FIG. 7). The male dovetail of the retainer R slides circumferentially into the interlocking female dovetail in the counterbore 42, and the flat rim 41 is deflected and overlaps the exposed outer marginal edge of the gasket-seal member E1 ( and E2) to firmly position the gasket-seal assembly prior to being installed over the pipe P under repair. The greater inner portions of tops 21 of the gasket-seals are exposed for simultaneous compression against the outer diameter 16 of the pipe P. In practice, the side gasket-seal members S1 and S2 are cemented into their positioning grooves 35.

The gasket-compression seal system hereinabove described will withstand test pressure in excess of 10,000 p.s.i.

Referring now to the protective liner or coating L, the thickness thereof is exaggerated in FIGS. 3, 4 and 5. The material employed for the liner plating or coating will vary according to its required tolerance to the product fluid being transported by the pipeline. As hereinabove stated, the liner can be a metallic plate such as Electroless Nickel of 0.002 to 0.005 inch thickness, which is electrically conductive, or other suitable plate or coating. In accordance with the preferred embodiment, a non-conductive coating inert to the product fluid is employed, which will vary with respect to the salinity, acidity, sour condition, and chemical as well as electrical reaction in the presence of the product fluid. For example, TEFLON (™) is such a practical coating that is employed herein for many applications. In practice, a variety of thin surface coatings can be utilized dependant upon the elements it is to tolerate, such as Electroless Nickel, electroplates, metalized coatings, epoxy and resin coatings, powder coatings, and other systems such as oven cured coatings. etc.

A feature of this invention is the termination of the non-conductive coating L by means for isolating the interior exposure to the product fluid from the exterior exposure to the surrounding environment. Therefore, the outer perimeter edge of the protective coating L terminates at the innermost side walls 27 and 37 and bottoms 26 and 36 of the gasket-seal grooves 25 and 35, where the gasket-seal members compressively seal thereagainst. Accordingly, the wet side of the protective coating is exposed only to the product fluid, whereas the dry perimeter side (or edge) of the coating is sealed off from the outside environmental atmosphere by the gasket-compression seals S, or from the compacted surrounding ground material. Therefore, the clamp-coupling C per se is isolated electrolytically from the product fluid, thereby reducing and/or eliminating the destructive effects of anodic electrolysis.

Referring now to FIGS. 9 and 10 of the drawings, a repair clamp C' is shown having all of the features hereinabove described. However, in a pipeline of moderate to large diameters and at moderate to low pressures, the pipe damage may be local and of such small magnitude as to make it impractical or unecessary to employ a second clamp body when one will suffice. FIG. 8 shows such a single clamp body 10' secured onto the pipe by means 15' forcefully securing said body to the outer diameter wall of the pipe P. As shown in FIG. 9, the clamp body 10" embraces 180° of the pipe wall, in which case the means 15' is one or more 90° bolts fastened through slotted openings at opposite side flanges 13' and 14' of the clamp body. In practice, the clamp body 10' can embrace as little as 90° of the pipe wall, in which case the means 15' is one or more conventional U-bolts engaged through the opposite side flanges 13' and 14' of the clamp body.

Since the aforesaid mating clamp body is not present to close the previously described open-sided seal groove 35, a closed seal groove 35' is provided as shown in FIG. 10 at opposite sides of clamp body 10', each having a bottom 36' positioned by the radial extent of circumferentially spaced side wall 37' and 37"0 offset and spaced from the flanges 13' and 14'.

From the foregoing, it will be understood that the unique peripheral termination of the internal dielectric protective coating L isolates the exterior leakage from pipe P of product fluid from the clamp or clamp-coupling bodies 10, 10' and 11, whereby the perimeter gasket-compression seals S preclude electrolytic conductivity. And it will be understood that compression gasket-seal continuity is ensured at each integral corner transition between seal members E1–E2 and S1–S2. And, a feature of seal continuity and seal effeciveness resides in the uninterrupted retainer R and its capture of the seal members E1–E2 in working position, while precluding extrusion of seal material under extreme pruduct fluid pressures.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A pipeline repair clamp for embracing a damaged outer diameter wall area of a pipe transporting fluid under pressure, and including:
    a semi-cylindrical body having opposite ends and each with a semi-circular seal groove open onto the pipe wall, and having opposite sides and each with a longitudinal seal groove open onto the pipe wall;
    means for forcibly securing said body onto the outer diameter wall of the pipe in position over said damaged area thereof;
    the body having a semi-cylindrical bore coextensively contiguous to the outer diameter wall of the pipe and within the confines of the aforesaid seal grooves;
    the seal grooves being openly continuous one into the other where the semi-circular seal grooves meet the longitudinal seal grooves;
    a continuous gasket-compression seal carried in into the aforesaid seal grooves and in pressured engagement with the outer diameter wall of the pipe to seal thereagainst; and
    a seal retainer comprised of a continuous uninterrupted semi-circular rim extending from side to side of the clamp body and overlapping an edge portion of the gasket-compression seal and coextensively contiguous to the semi-circular bore and secured thereto by an interlock means in the form of a slidable semi-circular dovetail connection between the retainer rim and clamp body.

2. The pipeline repair clamp as set forth in claim 1, wherein the means for forcibly securing the body onto said pipe is at least one semi-circular member disposed over the pipe between and bolted to opposite sides of the semi-cylindrical clamp body.

3. A pipeline repair clamp for embracing a damaged outer diameter wall area of a pipe transporting fluid under pressure, and including:
    a semi-cylindrical body having opposite ends and each with a semi-circular seal groove open onto the pipe wall, and having opposite sides and each with a longitudinal seal groove open onto the pipe wall;
    means for forcibly securing said body onto the outer diameter wall of the pipe in position over said damaged area thereof;
    the body having a semi-cylindrical bore coextensively contiguous to the outer diameter wall of the pipe and within the confines of the aforesaid seal grooves;
    the seal grooves being openly continuous one into the other where the semi-circular seal grooves meet the longitudinal seal grooves;
    a continuous gasket-compression seal carried in the aforesaid seal grooves and in pressured engagement with the outer diameter wall of the pipe to seal thereagainst; and
    a seal retainer comprised of a continuous uninterrupted semi-circular rim extending from side to side of the clamp body and overlapping an edge portion of the gasket-compression seal and coextensively contiguous to the semi-circular bore and secured thereto by an interlock means, there being a counterbore in the clamp body bore receiving the retainer rim recessed to the seimi-cylindrical bore of the clamp body.

4. The pipeline repair clamp as set forth in claim 1, wherein the semi-circular and longitudinal seal grooves each have a bottom displaced radially from the semi-cylindrical bore by spaced side walls contiguous to said bore, there being a protective liner-coating coextensive with the semi-cylindrical bore and contiguous seal groove side walls and terminating at the bottom walls thereof, the gasket-compression seal engaging simultaneously onto the outer diameter wall of the pipe and onto said side walls and bottom walls of the seal grooves for isolating the protective liner-coating from the clamp body.

5. The pipeline repair clamp as set forth in claim 4, wherein the protective liner-coating is a metallic electrically conductive plate.

6. The pipeline repair clamp as set forth in claim 4, wherein the protective liner-coating is a dielectric insulating material for electrically isolating the transporting fluid from the clamp body.

7. A pipeline repair clamp-coupling for embracing a damaged outer diameter wall area of a pipe transporting fluid under pressure, and including:
    complementary semi-cylindrical bodies having opposite ends and each with a semi-circular seal groove open onto the pipe wall, and having diametral interface engagement at opposite sides and each with a longitudinal seal groove open onto the pipe wall;
    means for forcibly securing the diametral interfaces of said bodies embraced onto the outer diameter wall of the pipe in position over said damaged area thereof;
    each of the bodies having a semi-cylindrical bore on a common axis with and coextensively contiguous to the outer diameter wall of the pipe and within the confines of its seal grooves;
    the seal grooves in each body being openly continuous one into the other where the semi-circular seal grooves meet the longitudinal seal grooves;
    a continuous gasket-compression seal carried in the aforesaid seal grooves of each body and in pressured engagement with the outer diameter wall of the pipe to seal thereagainst; and further including
    a seal retainer comprised of a continuous uninterrupted semi-circular rim extending from side to side of each clamp body and overlapping an edge portion of the semi-circular seal grooves at opposite ends of the bodies and securing the gasket-compression seals between opposite sides of the bodies coextensively continuous to the semi-circular bores between opposite sides of the bodies and secured to said bodies by an interlock means in the form of a slidable semi-circular dovetail connection between the retainer rims and each clamp body.

8. The pipeline repair clamp-coupling as set forth in claim 7, wherein the means for forcibly securing the bodies onto said pipe is comprised of radial flanges with interface engagement at opposite sides of each semi-circular clamp body, there being fasteners drawing said flanges together.

9. A pipeline repair clamp-coupling for embracing a damaged outer diameter wall area of a pipe transporting fluid under pressure, and including:

complementary semi-cylindrical bodies having opposite ends and each with a semi-circular seal groove open onto the pipe wall, and having diametral interface engagement at opposite sides and each with a longitudinal seal groove open onto the pipe wall;

means for forcibly securing the diametral interfaces of said bodies embraced onto the outer diameter wall of the pipe in position over said damaged area thereof;

each of the bodies having a semi-cylindrical bore on a common axis with and coextensively contiguous to the outer diameter wall of the pipe and within the confines of its seal grooves;

the seal grooves in each body being openly continuous one into the other where the semi-circular seal grooves meet the longitudinal seal grooves;

a continuous gasket-compression seal carried in the aforesaid seal grooves of each body and in pressured engagement with the outer diameter wall of the pipe to seal thereagainst; and further including a seal retainer comprised of a continuous uninterrupted semi-circular rim extending from side to side of each clamp body and overlapping an edge portion of the semi-circular seal grooves at opposite ends of the bodies and securing the gasket-compression seals between opposite sides of the bodies coextensively continuous to the semi-circular bores between opposite sides of the bodies and secured to said bodies by an interlock, there being a counterbore in each clamp body bore receiving the retainer rims recessed to the semi-cylindrical bore of said clamp body.

10. The pipeline repair clamp-coupling as set forth in claim 7, wherein the semi-circular seal grooves each have a bottom displaced radially from the semi-cylindrical bore by spaced side walls contiguous to said bore, and wherein the longitudinal seal grooves each have a bottom displaced radially from the semi-cylindrical bore by a single side wall circumferentially offset from an open side of said groove at the diametral interface engagement of said clamp bodies, there being a protective liner-coating coextensive with the semi-cylindrical bore and contiguous seal groove side walls and terminating at the bottom walls thereof, the gasket-compression seal engaging simultaneously onto the outer diameter wall of the pipe and onto said side walls and bottom walls of the seal grooves for isolating the protective liner-coating from the clamp body.

11. The pipeline repair clamp-coupling as set forth in claim 10, wherein the protective liner-coating is a metallic electrically conductive plate.

12. The pipeline repair clamp-coupling as set forth in claim 10, wherein the protective liner-coating is a dielectric insulating material for electrically isolating the transporting fluid from the clamp body.

* * * * *